(12) United States Patent
Shuvali et al.

(10) Patent No.: US 10,459,937 B2
(45) Date of Patent: Oct. 29, 2019

(54) EFFECT OF OPERATIONS ON APPLICATION REQUESTS

(71) Applicant: ENTIT SOFTWARE LLC, Sanford, NC (US)

(72) Inventors: Haim Shuvali, Yehud (IL); Noam Mor, Yehud (IL); Guy Offer, Yehud (IL); Avi Kabizon, Yehud (IL); Meir Ron, Yehud (IL)

(73) Assignee: MICRO FOCUS LLC, Santa Clara, CA (US)

( * ) Notice: Subject to any disclaimer, the term of this patent is extended or adjusted under 35 U.S.C. 154(b) by 508 days.

(21) Appl. No.: 15/198,550

(22) Filed: Jun. 30, 2016

(65) Prior Publication Data

US 2018/0004819 A1    Jan. 4, 2018

(51) Int. Cl.

| | |
|---|---|
| *G06F 16/248* | (2019.01) |
| *G06F 16/27* | (2019.01) |
| *G06F 16/9535* | (2019.01) |
| *G06F 11/34* | (2006.01) |
| *G06F 11/32* | (2006.01) |

(52) U.S. Cl.
CPC ........ *G06F 16/248* (2019.01); *G06F 11/3419* (2013.01); *G06F 11/3452* (2013.01); *G06F 11/3495* (2013.01); *G06F 16/273* (2019.01); *G06F 16/9535* (2019.01); *G06F 11/323* (2013.01); *G06F 2201/865* (2013.01); *G06F 2201/875* (2013.01)

(58) Field of Classification Search
None
See application file for complete search history.

(56) References Cited

U.S. PATENT DOCUMENTS

| | | |
|---|---|---|
| 6,671,818 B1 | 12/2003 | Mikurak |
| 7,237,023 B2 | 6/2007 | Menard et al. |
| 7,475,067 B2 | 1/2009 | Clary et al. |
| 8,078,691 B2 | 12/2011 | Zhang et al. |
| 10,102,101 B1 * | 10/2018 | Velaga ............... G06F 11/3419 |
| 2005/0262240 A1 | 11/2005 | Drees et al. |
| 2007/0271219 A1 * | 11/2007 | Agarwal ............... G06F 11/008 |
| 2008/0270412 A1 | 10/2008 | Udayasankar et al. |
| 2010/0161789 A1 * | 6/2010 | Walia ................. G06F 11/3414 |
| | | 709/224 |
| 2012/0151488 A1 | 6/2012 | Arcese et al. |

(Continued)

FOREIGN PATENT DOCUMENTS

WO    WO-2016175863    11/2016

*Primary Examiner* — Wynuel S Aquino

(57) ABSTRACT

A plurality of completion times associated with an application request may be obtained. The plurality of completion times may include a first completion time and a second completion time. A plurality of response times associated with a first asynchronous operation triggered by the application request may be obtained. The plurality of completion times may include a first response time associated with the first completion time and a second response time associated with the second completion time. A first correlation score may be determined describing an effect of the first asynchronous operation on the application request based on the first completion time, the second completion time, the first response time, and the second response time. Visualization data may be generated representing the first correlation score.

20 Claims, 6 Drawing Sheets

(56) References Cited

U.S. PATENT DOCUMENTS

| | | | |
|---|---|---|---|
| 2014/0059179 A1* | 2/2014 | Lam | H04N 21/234363 |
| | | | 709/219 |
| 2015/0095761 A1* | 4/2015 | Gasperi | G06Q 10/06393 |
| | | | 715/234 |
| 2015/0199254 A1* | 7/2015 | Vesepogu | G06F 11/0709 |
| | | | 717/130 |
| 2015/0286394 A1* | 10/2015 | Koval | H04L 67/06 |
| | | | 713/156 |

* cited by examiner

EFFECT OF OPERATIONS ON APPLICATION REQUESTS

BACKGROUND

An application request may trigger an application transaction with a particular execution flow. A particular execution flow may include numerous operations, including asynchronous and synchronous operations.

BRIEF DESCRIPTION

Some examples are described with respect to the following figures.

DETAILED DESCRIPTION

Figure 1:
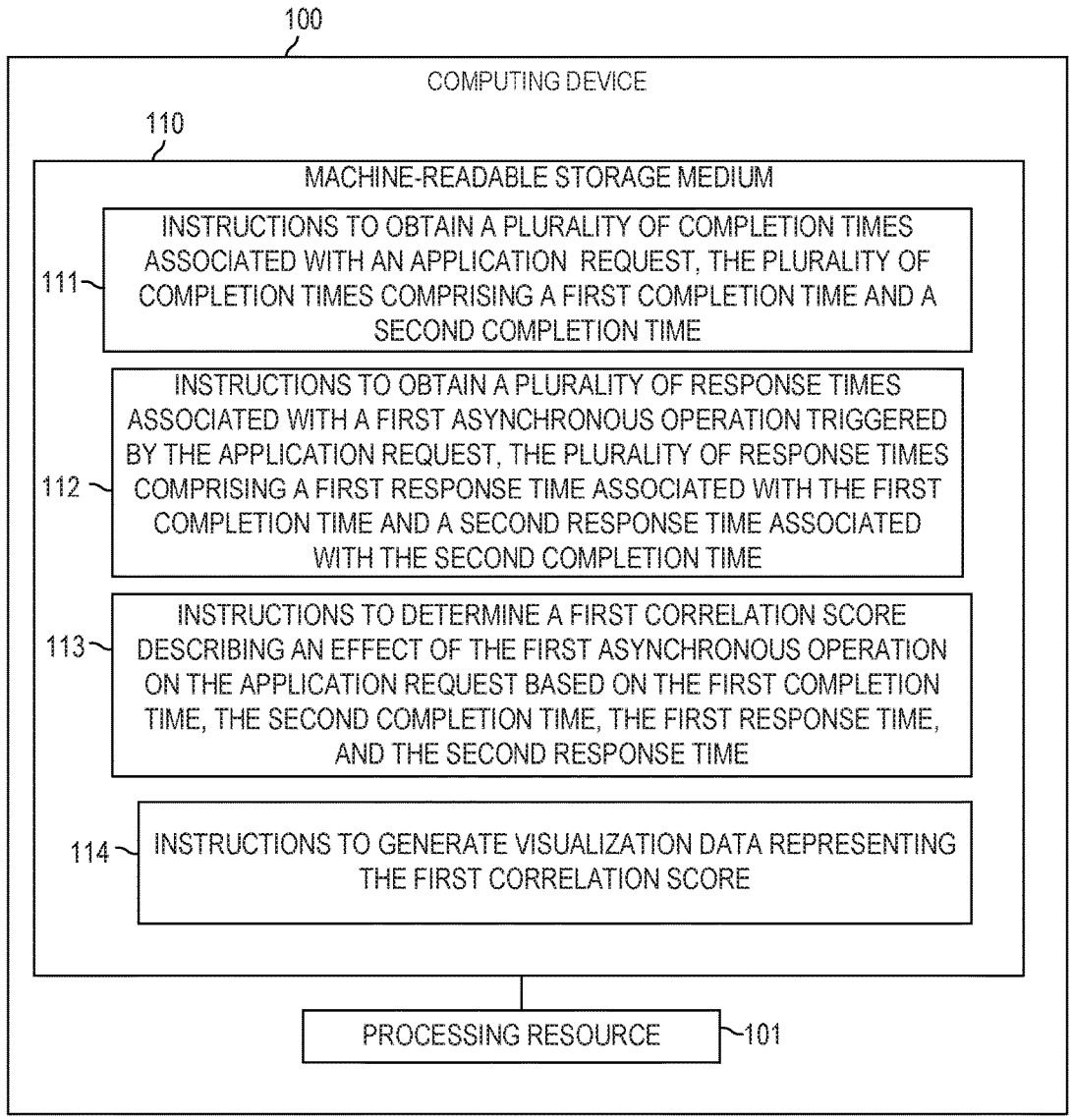
FIG. 1 is a block diagram of a computing device to determine a first correlation score, according to some examples.

The code of an application (computer program instructions, e.g. instructions executable by a processor) may be communicatively coupled to a computing device such that the computing device executes the code to run the application. When the computing device receives an application request, an application transaction is triggered that may fulfill or complete the application request. As understood herein, an "application transaction" is an application's execution flow, i.e. a sequence of operations executed by the code of the application when a specific application request is received. Thus, as understood herein, an "application request" is a signal that triggers an application transaction. The application request may be received by the computing device.

The operations in an application's execution flow triggered by an application request may include asynchronous operations and synchronous operations. A synchronous operation is an operation that blocks the application's execution flow. In other words, other operations cannot initiate until the synchronous operation is completed. For example, the execution of a first portion of code that makes a synchronous call to a second portion of code is paused until the second code returns to the first code. Thus, the operation performed by the second portion of code is a synchronous operation. By contrast, an asynchronous operation does not block the execution flow. In other words, other operations may initiate while the asynchronous operation is being performed. A non-limiting example of an asynchronous operation is an XML HTTP call (e.g., AJAX).

In some situations, an application request is not completed until the operations in the application's execution flow are completed. In other situations, the application request may be completed before the operations in the application's execution flow are completed. This is because the application request may trigger operations that are unrelated to the main purpose of the application request. For example, the main purpose of an application request for a webpage load is the webpage load. However, the application request may trigger, in its execution flow, an operation to report data to a third party analytics software or providers. The operation to report data may not affect the completion of the webpage load (application request) as perceived by the user because the operation may not bring back data to be rendered. Thus, in some situations, the time of completion of the application request (i.e. completion time) may depend on the time of completion of the operations (i.e. response times) in the execution flow. In other situations, the time of completion of the application request does not depend on the time of completion of the operations.

Completion times associated with respective application requests and response times associated with respective operations triggered by application requests may be monitored. This may help identify which application requests and operations have slow response times.

However, in some examples, the identification of slow operations may be insufficient to help bolster the completion time of the application request to increase application performance. This may be because some operations, as discussed above, do not affect the completion of the application request. Thus, an identification of a slow operation does not correspond to that operation contributing to the completion time of the application request.

Additionally, the function of an operation initiated by that application request may be difficult to decipher. For example, the entity that may be running the application may not be the same entity that developed the application. Without the knowledge of the entity that developed the application, it may be hard to determine what function an operation is doing. Also, application requests occur during executed instances of the application. An operation triggered by an application request in one executed instance may be different from an operation triggered by an application request in another executed instance. Thus, the identification of a slow operation for one executed instance of an application may not apply to another executed instance. Additionally, the slow operation in that one executed instance may be related to factors that are specific to that executed instance (e.g., network issues, etc.) and unrelated to a wide-spread issues present in the application.

Examples discussed herein address these technological challenges by providing a way to identify which operations triggered by an application request affect the completion of the application request and by how much the operations affect the completion. Examples discussed herein also provide a way to identify operations that are creating wide-spread issues across multiple executed instances of an application. Thus, examples discussed herein allow for comprehensive application performance monitoring.

In some examples, a non-transitory machine-readable storage medium with instructions is provided. The instructions are executable by a processing resource to obtain a plurality of completion times associated with an application request, and to obtain a plurality of response times associated with a first asynchronous operation that is triggered by the application request. The plurality of completion times may include a first completion time and a second completion time. The plurality of response times may include a first response time associated with the first completion time and a second response time associated with the second completion time. The instructions are also executable by a processing resource to determine a first correlation score describing an effect of the first asynchronous operation on the application request based on the first completion time, the second completion time, the first response time, and the second response time, and to generate visualization data representing the first correlation score.

In some examples, a computing device is provided including a query engine, a correlation engine, and a visualization engine. The query engine is to obtain a first completion time associated with an application request, to obtain a first response time associated with a first asynchronous operation triggered by the application request, and to obtain a second response time associated with a second asynchronous operation triggered by the application request. The correlation engine is to determine a first correlation score describing an effect of the first asynchronous operation on the application request based on the first completion time and the first response time. The correlation engine is also to determine a second correlation score describing an effect of the second asynchronous operation on the application request based on the first completion time and the second response time. The visualization engine is to generate visualization data representing the first correlation score and the second correlation score.

In some examples, a method is provided including obtaining a first completion time associated with a first application request, obtaining a first response time associated with a first operation, determining a first correlation score describing an effect of the first operation on the first application request based on the first completion time and the first response time. The first operation is triggered by the first application request. The method also includes obtaining a second completion time associated with a second application request, obtaining a second response time associated with a second operation, and updating the first correlation score based on the second completion time and the second response time. The second operation is triggered by the second application request.

The following terminology is understood to mean the following when recited by the specification or the claims. The singular forms "a," "an," and "the" mean "one or more." The terms "including" and "having" are intended to have the same inclusive meaning as the term "comprising."

Referring now to the figures, FIG. 1 is a block diagram of a computing device 100 to determine a first correlation score. As used herein, a "computing device" may be a server, computer networking device, chip set, desktop computer, workstation, or any other processing device or equipment. In some examples, computing device 100 may be a server that interfaces with a plurality of other computing devices.

Computing device 100 includes a processing resource 101 and a machine-readable storage medium 110. Machine-readable storage medium 110 may be in the form of non-transitory machine-readable storage medium, such as suitable electronic, magnetic, optical, or other physical storage apparatus to contain or store information such as instructions 111, 112, 113, 114, related data, and the like.

As used herein, "machine-readable storage medium" may include a storage drive (e.g., a hard drive), flash memory, Random Access Memory (RAM), any type of storage disc (e.g., a Compact Disc Read Only Memory (CD-ROM), any other type of compact disc, a DVD, etc.) and the like, or a combination thereof. In some examples, a storage medium may correspond to memory including a main memory, such as a Random Access Memory, where software may reside during runtime, and/or a secondary memory. The secondary memory can, for example, include a nonvolatile memory where a copy of software or other data is stored.

In the example of FIG. 1, instructions 111, 112, 113, and 114 are stored (e.g., encoded) on storage medium 110 and are executable by processing resource 101 to implement functionalities described herein in relation to FIG. 1. In some examples, storage medium 110 may include additional instructions, like, for example, the instructions to implement some of the functionalities described in relation to computing device 400 of FIG. 4. In some examples, the functionalities of any of the instructions of storage medium 110 may be implemented in the form of electronic circuitry, in the form of executable instructions encoded on machine-readable storage medium, or a combination thereof.

Processing resource 101 may, for example, be in the form of a central processing unit (CPU), a semiconductor-based microprocessor, a digital signal processor (DSP) such as a digital image processing unit, other hardware devices or processing elements suitable to retrieve and execute instructions stored in a storage medium, or suitable combinations thereof. The processing resource can, for example, include single or multiple cores on a chip, multiple cores across multiple chips, multiple cores across multiple devices, or suitable combinations thereof. The processing resource can be functional to fetch, decode, and execute instructions 111, 112, 113, and 114, as described herein.

Instructions 111 may be executable by processing resource 101 such that computing device obtains a plurality of completion times associated with an application request. In some examples, an application request may include a user action (e.g., a user clicking on a link in a webpage, a user pressing a button in a mobile application, etc.). In some examples, an application request may include a request that is initialized by a computing device (e.g., a browser refreshing the webpage, etc.). In some examples, an application request may be in the form of a uniform resource locater (URL) with a protocol identifier (e.g., HTTP) and a resource name.

For example, an application request may be a request to display a webpage, and may be in the form of an HTTP URL request to a web server. The application transaction triggered by the HTTP URL may include an execution flow across several layers (e.g., all layers) of a computing network, including a computing layer (e.g., server layer) that includes at least one computing device (e.g., a server) and a database layer including at least one database server. For example, when the application transaction interacts with the computing layer, code may run in one server and may make function calls to another computing device (e.g., server). The code may then make function calls to other layers, such as to database servers in a database layer. In some examples, an application request may be from a user computing device in a computing network and thus, in some examples, an application transaction may begin in a user computing device (e.g., mobile computing device, laptop computer, desktop computer, tablet, etc.) then make function calls to servers, other computers, and database servers, etc. Thus, in the example discussed above where the application is an HTTP URL request to a web server, the application transaction may be a sequence of operations that cause a webpage to display on the device where the request originated. In some examples, even though the application transaction triggered by the application request may include execution flow across several computing layers (i.e. operations involving several computing layers), response times obtained may be associated to operations involving similar layers (e.g., response times for operations involving an application layer and a server layer, a response times for operations involving a server layer and a database layer, etc.).

As understood herein, a "completion time" is the length of time for the application request to be fulfilled. Thus, a "completion time" may be measured from the end of an inputted request ($Time_O$), to the end of a visible response to the request by a user of the application ($Time_E$). In some examples, a "completion time" may be the same as the length of time for the application transaction to be completed. In these examples, the operations in the application transactions may affect the completion of the application request. In other examples, a "completion time" is different from the length of time for the application transaction to be completed. In these examples, the operations in the application transactions may not all affect the completion of the application request.

As an example, in a situation where the application request is for display of a webpage, the completion time may be measured from the end of the request being inputted (e.g., by a user or by a computing device) to when the webpage is displayed (i.e. completed rendering) on the user computing device. As another example, in a situation where the application request is a user input in a mobile application (e.g., by a user interacting with a button), the completion time may be measured from the end of the user input to the end of the application displaying a response to the user input. This may be characterized as a wait time between the user inputting the input and the user receiving a visible response from the mobile application. Thus, in some examples, a completion time may include a time for a client device to render the information received.

In some examples, and in the example of FIG. 1, the plurality of completion times obtained by computing device 100 when executing instructions 111 include a first completion time and a second completion time. In some examples, the first completion time may be from one particular executed instance of the application and the second completion time may be from another particular executed instance of the application.

In some examples, an application may implement one application transaction. In these examples, an application request from one executed instance of the application is the same as an application request from another executed instance of the application.

In other examples, multiple different application transactions may be implemented by an application, depending on the execution path followed by a particular executed instance of the application. In some examples where multiple different application transactions may be implemented, one particular executed instance of the application may include an application request that triggers one application transaction and another particular executed instance of the application may include an application request that triggers a different application transaction. In other examples where multiple different application transactions may be implemented, one particular executed instance of the application may include an application request that triggers one application transaction and another particular executed instance of the application may include an application request that triggers the same or similar application transaction. Thus, in examples where multiple different application transactions may be implemented by an application, the application request of the first completion time may be characterized as a first application request and the application request of the second completion time may be characterized as a second application request.

In some examples, the first application request may be similar in function to the second application request but may include a different form (e.g., having a different URL.).

Accordingly, instructions 111 may include instructions to determine the similarity of the first application request to the second application request. Instructions 111 may include instructions to group the first application request and the second application request into a first group of application request upon determining that the first application request and the second application request are similar. This is discussed below in relation to FIG. 4.

Instructions 112 may be executable by processing resource 101 such that computing device 100 obtains a plurality of response times associated with a first operation triggered by the application request. As discussed above, an application request triggers an application transaction which includes a sequence of operations executed by code of the application. Thus, an operation may be triggered by an application request even if an operation is not immediately triggered by the application request. An operation may include synchronous operations or asynchronous operations. An operation may also be in the form of a URL request. In some examples, the URL for an asynchronous operation may include an XHR (XML HTTP) request. For example, an application request may be a customer bill pay webpage. An asynchronous operation triggered may be an HTTP URL request for a button to add a payee. Another asynchronous operation triggered may be an HTTP URL request for the history of a customer's bill pay.

A "response time" for an operation includes the length of time for the operation to be completed. In some examples, this may be measured from when the request is received by a receiving computing device (e.g., a server) to when the receiving computing device provides the data requested. The time at which "the receiving computing device provides the data" may include the time when the receiving computing device begins to provide the data requested, the time when the receiving computing device finishes providing the data requested, and any time in between the start and finish of the receiving computing device providing the data requested. In some examples, the time is when the receiving device finishes providing the data requested. In some examples, this time may also include a time for a requesting computing device (e.g., a client-side device) to render the data provided.

In some examples, instructions 112 may be executable by processing resource 101 such that computing device 100 obtains a first response time and a second response time. In some examples, the first response time is associated with the first completion time and the second response time is associated with the second completion time. Thus, the first response time and the first completion time may be amounts of time during one executed instance of the application (with the first completion time being the amount of time for the request to be completed in that instance and the first response time being the amount of time for the operation to be completed during the same executed instance) and the second response time and the second completion time may be amounts of time during another executed instance of the application (with the second completion time being the amount of time for the same request to be completed in another instance and the second response time being the amount of time for the same operation to be completed during the same executed instance).

Instructions 113 may be executable by processing resource 101 such that computing device 100 determines a correlation score. A correlation score for an application request and an operation describes an effect of the operation on the application request. For example, when an application request is a webpage request, an asynchronous operation may include a request for a button appearing on the webpage (e.g., through an HTTP request). A correlation score for the webpage request and the button describes an effect of the request for the button on the webpage request. In some examples, a correlation score may describe the effect of the request of the button on the completion of the application request.

In non-limiting examples, a correlation score may be numerical, graphical, alphabetical, and/or a combination thereof. In some examples, a correlation score is based upon a pre-defined scale. For example, an alphabetical correlation score may be based on a pre-defined scale of A through E, with A describing the highest effect, B describing the second highest effect, C describing the third highest effect, D describing the second to lowest effect, and E describing the lowest effect that the asynchronous operation has on the application request. As another non-limiting example, a numerical correlation score may be based on a pre-defined scale of 1-5, with 5 describing the highest effect, and 1 describing the lowest effect.

In some examples, instructions 113 determines a first correlation score describing an effect of the first asynchronous operation on the application request based, at least in part, on the first completion time, the second completion time, the first response time, and the second response time.

In some examples, instructions 113 may determine a correlation score by determining two averages, one average for the response times and another average for the completion times, The correlation score may then be determined by comparing the averages to each other. For example, a 1:1 correspondence of the response times average and the completion times average may indicate that the first operation has a high effect on the application request while a 2:1 correlation may indicate that the first operation has a lower effect on the application request. In examples where there is a 1:1 correspondence, instructions 113 may determine a high correlation score (for example, determining a score of A or a 5).

In other examples, instructions 113 may determine a first correlation score through determining a Pearson coefficient. A Pearson coefficient is based on a statistical process that determines a linear correlation between two variables. The Pearson coefficient may be determined by:

$$r = r_{xy} = \frac{\sum_{i=1}^{n}(x_i - \bar{x})(y_i - \bar{y})}{\sqrt{\sum_{i=1}^{n}(x_i - \bar{x})^2}\sqrt{\sum_{i=1}^{n}(y_i - \bar{y})^2}} \quad \text{(Eq. 1)}$$

where r is the coefficient, n is the number of samples, $X_i \ldots X_n$, are the different completion times in the sample, $Y_i \ldots Y_n$ are the different the response times in the sample, $\bar{x}$ and $\bar{y}$ are averages for their respective sets that may be calculated as (analogous calculation for $\bar{y}$:

$$\bar{x} = \frac{1}{n}\sum_{i=1}^{n}x_i \quad \text{(Eq. 2)}$$

In these examples, the Pearson coefficient may range from −1.0 to +1.0, where +1.0 indicates a high positive linear correlation (one variable increases as the other variable increases), −1.0 indicates a high negative linear correlation (one variable decreases as the other variable decreases), and 0 indicates no linear correlation.

In some examples, instructions 113 may use the Pearson coefficient as the correlation score. For example, instructions 113 may determine that a correlation score is 0.78 because the Pearson coefficient is 0.78. In other examples, instructions 113 may translate the Pearson coefficient into a correlation score. For example, instructions 113 may determine that a correlation score is A because the calculated Pearson coefficient is 1.0 or a correlation score is B because the calculated Pearson coefficient is 0.65.

In some examples, a pre-defined scale may be used with Pearson coefficients, such that a 0.7 to 1.0 Pearson coefficient is interpreted to indicate a high correlation, a 0.4 to 0.7 coefficient is interpreted to indicate a medium correlation, a 0.1 to 0.4 coefficient is interpreted to indicate a low correlation, and a −1.0 to 0.1 coefficient is interpreted to indicate no correlation. Thus, even though a Pearson coefficient of −1.0 indicates a high mathematical negative correlation between two variables, in some examples, instructions 113 determines that a negative Pearson coefficient (−1.0 to 0.0) does not indicate a real-world correlation between an application request and an operation.

In the example of FIG. 1, there are two values obtained for the completion time and two values for the response time. However, in other examples, and as discussed herein, the plurality of completion times and the plurality of response times is not limited to two and may include more or less completion times and response times. Thus, computing device 100 may include instructions to obtain additional completion times associated with the application request and obtain additional response times associated with the first operation and instructions 113 may determine a first correlation score based on those additional response times and completion times.

Instructions 114 may be executable by processing resource 101 such that computing device 100 generates visualization data representing the first correlation score. In some examples, the visualization data is to display the first correlation score on a user output device such as a liquid crystal display, video monitor, touch screen display, etc. Visualization data that represents the first correlation score may include the correlation score itself, along with other data that may help a user understand the effect of the operation on the application request, such as colors, images, graphs, etc. In some examples, instructions 114 may include instructions to send the visualization data and instructions to display the visualization data to an output device (e.g., liquid crystal display (LCD), video monitor, touch screen display, light-emitting diode (LED), etc.). In some examples, visualization data may generate the user interface shown in FIG. 7 on the output device.

In some examples, machine-readable storage medium 110 of computing device 100 may include instructions to determine a new correlation score based on new completion times and/or response times associated with an operation and an application request for which a correlation score has already been determined. In relation to the example discussed above with the first completion time and second completion time for one application request, machine-readable storage medium 110 may include instructions to obtain a third completion time that is associated with the same application request. Additionally, machine-readable storage medium 110 may also include instructions to obtain a third response time associated with the same operation that the first response time and the second response time are associated with. The third response time may be associated with the third completion time.

In some examples, the determination of a new correlation score may include re-computing the correlation score as described above using the old response times and completion times and the new response times and completion times. For example, where the correlation score is based on a comparison of the response times average to the completion times average, the completion time average may be re-computed using the first completion time, the second completion time, and the new third completion time. Similarly, response times average may be re-computed using the first response time, the second response time, and the new third response time. As another example, in examples where the correlation score is based on a Pearson coefficient, the Pearson coefficient may be re-computed using Eq. 1.

However, a re-computation each time a new response time or a new completion time is obtained may be a lengthy process for big data sets where there are numerous response times and numerous completion times. Thus, in some examples, the correlation score is updated based on an update of the underlying value (e.g., average values, Pearson coefficient, etc.) instead of a re-computation of the underlying value. In some examples, sum accumulators may be used to determine the initial value for the initial correlation score and these accumulators may be updated when a new response time or a new completion time is obtained to update the initial correlation score.

For example, in examples using the average comparison, one accumulator may be used for the sum of the response times and a second accumulator may be used for the sum of completion times. Thus, when a new response time or a new completion time is obtained, the new response time is added to the accumulator for the sum of the response times and the new completion time is added to the accumulator for the sum of the response times. The sum may then be divided by the new total number of samples to obtain the new averages for the both response times and the completion times and the new averages may then be compared.

In examples using the Pearson coefficient to determine correlation scores, a modified Pearson process may be used instead of using the Pearson computation in equation E1 to determine an initial Pearson coefficient (that may be used to determine the initial correlation score, as discussed above) and to update the initial Pearson coefficient (that may be used to update the initial correlation score). The modified Pearson process may be presented by:

$$r = \frac{\sum XY - \frac{\sum X \sum Y}{N}}{\sqrt{\left(\sum X^2 - \frac{(\sum X)^2}{N}\right)\left(\sum Y^2 - \frac{(\sum Y)^2}{N}\right)}} \quad \text{(Eq. 3)}$$

where N is the total number of samples, x are the completion times, and y are the response times.

In Eq3, there are six sum accumulators, a first for the product of completion times and response times (X and Y), a second for completion times (X), a third for response times (Y), a fourth for the square of completion times ($X^2$), a fifth for the square of response times ($Y^2$), and a sixth for the number of samples (N). The modified Pearson calculation may allow for computing device 100 to update an old Pearson coefficient by updating the sum accumulators.

Table 1 below shows an example the determination of the initial sum accumulator from a first response time and a first completion time during a first executed instance of an application and a second response time and a second completion time during a second executed instance. The first completion time and the second completion time relate to the same or similar application transactions and the second response time and the first response time relate to the same or similar operations. The initial Pearson coefficient may be determined by inputting the sum accumulator values into Eq3 and the initial correlation score may be determined from this initial Pearson coefficient as discussed above.

TABLE 1

|  | N | X | Y | XY | $X^2$ | $Y^2$ |
|---|---|---|---|---|---|---|
| First Instance | 1 | 1 | 2 | 2 | 1 | 4 |
| Second Instance | 1 | 3 | 5 | 15 | 9 | 25 |
| Sum Accumulator | 2 | 1 + 3 = 4 | 2 + 5 = 7 | 2 + 15 = 17 | 1 + 9 = 10 | 25 + 4 = 29 |

Table 2 shows an example of incrementing the sum accumulators when a third completion time and a third response time are obtained at a third executed instance. The third completion time relate to the same or similar application transaction as the application transaction in the first and second completion times and the third response time relate to the same operation as the first and second response times. As may be seen by Table 2, the values of the third instance are added to the sum accumulator values of Table 1 to determine new sum accumulator values.

TABLE 2

|  | N | X | Y | XY | $X^2$ | $Y^2$ |
|---|---|---|---|---|---|---|
| Third Instance | 1 | 4 | 5 | 20 | 16 | 25 |
| New Sum Accumulator | 3 | 4 + 4 = 8 | 7 + 5 = 12 | 17 + 20 = 37 | 16 + 10 = 26 | 29 + 25 = 54 |

Thus, the sum accumulators are updated and then applied in Eq3 to update the Pearson coefficient. Based on the updated Pearson coefficient, a correlation score may be determined, as discussed above in relation to instructions 113. Machine-readable storage medium may also include instructions to update the visualization data to represent the updated correlation score. The sum accumulators may be stored in a memory of computing device 100. The values of the completion times, and the response times, and the number of instances in Tables 1 and 2 are for the purposes of explanation and not restrictive.

In some examples, Eq3 may be used to aggregate groups having numerous response times associated with the same operation to determine a Pearson coefficient that characterizes the aggregated group. The Pearson coefficient may be used to determine a correlation score, as discussed above. For example, one group may have N1 values of response times and associated completion times (for example, 150 N values) and another group may have N2 values of response times and associated completion times (for example, 200 N values). The group with N1 values may have a first set of six sum accumulators and the group with N2 values may have a second set of six sum accumulators. The sum accumulators for both groups may be added and Eq3 may be used to aggregate these two groups and determine a Pearson coefficient that represents the aggregated group (350 N values of response times and completion times). The Pearson coefficient may be used to determine a correlation score, as discussed above. Thus, in some examples, the modified Pearson process (Eq3) may be used to effectively and quickly process large sample numbers without reference to the computation represented by Eq1.

In some examples, machine-readable storage medium 110 may include instructions to obtain response times associated with at least one operation that is triggered by the application request (e.g., the first operation as discussed above, a second operation in addition to the first operation, etc.). Similarly, machine-readable storage medium may include instructions to determine a correlation score for at least one of the operations for which it obtains response times. Thus, if it obtains response times for five operations triggered by the application request, it may determine one, two, three, four, or five correlation scores. In some examples where response times associated with at least two operations are obtained, the at least two operations involve the same layers in the application transaction. For example, an application request may trigger three operations, operation A, B, and C. Operation A involves an application layer and a server layer. Operation B involves the server layer and a database layer. Operation C involves the application layer and the server layer. The response times obtained includes a response time for operation A and a response time for operation C (as they involve the same layers) but not a response time for operation B.

Additionally, in some examples, machine-readable storage medium 110 may include instructions to obtain completion times that are associated with at least one application request (e.g., the application request discussed above, a second application request that is different from the application request discussed above, eta).

Figure 2:
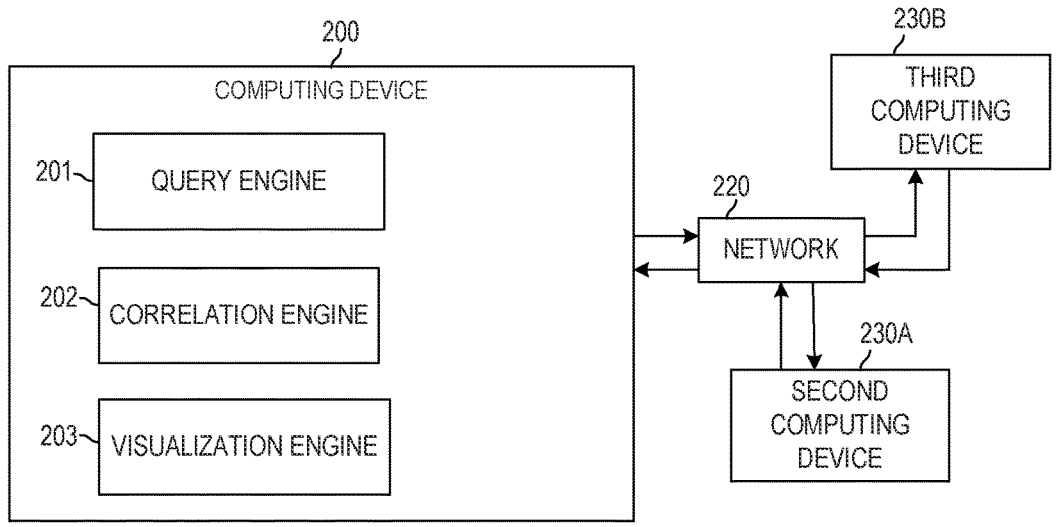
FIG. 2 is a block diagram of a computing device to determine a first correlation score and a second correlation score, according to some examples.
Figure 4:
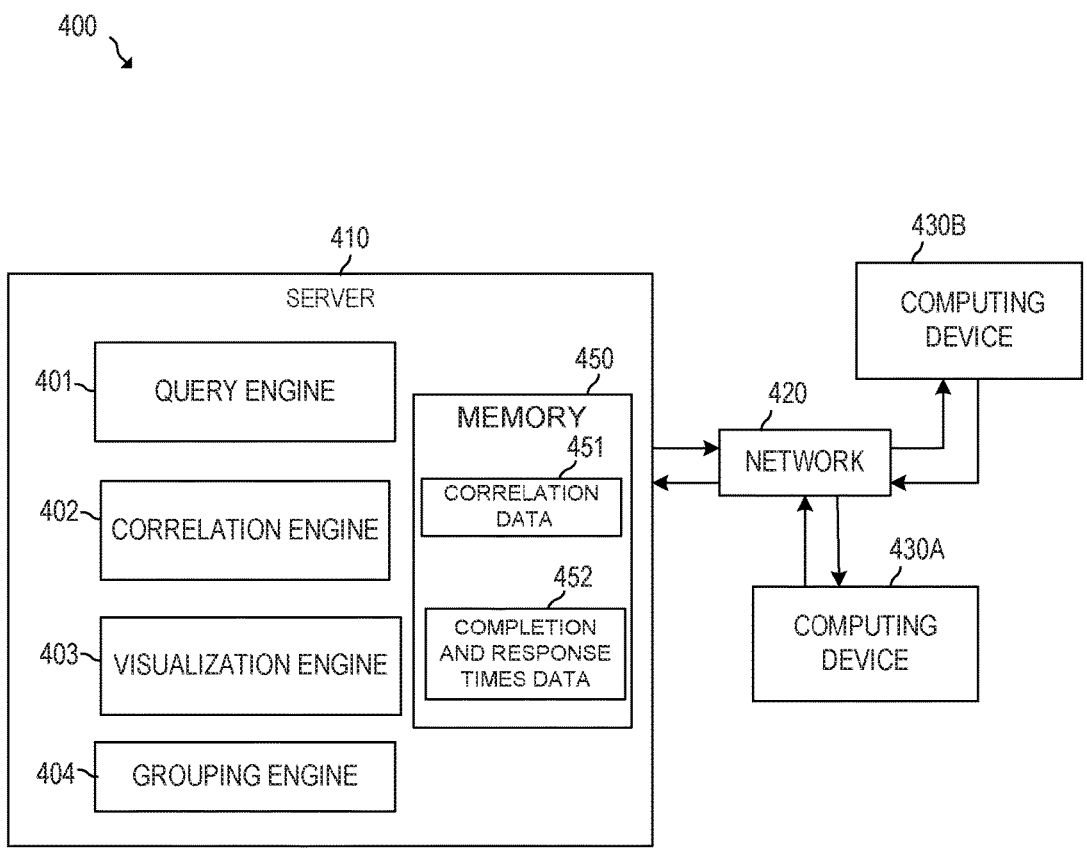
FIG. 4 is a block diagram of a system to determine a first correlation score, according to some examples.

Computing device 100 of FIG. 1, which is described in terms of processors and machine-readable storage mediums, may include structural or functional aspects of computing device 200 of FIG. 2 or server 410 of FIG. 4, which are described in terms of functional engines containing hardware and software.

FIG. 2 is a block diagram of a computing device 200 to determine a correlation score. Computing device 200, like computing device 100, may be a server, computer networking device, chip set, desktop computer, workstation, or any other processing device or equipment. In some examples, computing device 200 interfaces with second computing device 230A and third computing device 230B over communications network 220.

In some examples, communication network 220 may be a wireless network, a wired network, or a combination thereof. In some examples, network 220 may be an individual network or a collection of many such individual networks interconnected with each other and functioning as a single large network (e.g., the Internet or an intranet). In some examples, communication network 220 may be implemented as a local area network (LAN), wide area network (WAN), etc. In other examples, and not shown in FIG. 2, computing device 200 may be directly coupled to third computing device 230B and second computing device 230A.

Computing device 200 includes query engine 201, correlation engine 202, visualization engine 203, and memory 250. Each of these aspects of computing device 200 will be described below. Other engines may be added to computing device 200 for additional functionality.

Each of engines 201, 202, 203, and any other engines, may be any combination of hardware (e.g., a processor such as an integrated circuit or other circuitry) and instructions (e.g., machine or processor-executable instructions, commands, or code such as firmware, programming, or object code) to implement the functionalities of the respective engine. Such combinations of hardware and programming may be implemented in a number of different ways. A combination of hardware and software can include hardware (i.e., a hardware element with no software elements), software hosted at hardware (e.g., software that is stored at a memory and executed or interpreted at a processor), or at hardware and software hosted at hardware. Additionally, as used herein, the singular forms "a," "an," and "the" include plural referents unless the context clearly dictates otherwise. Thus, for example, the term "engine" is intended to mean at least one engine or a combination of engines. In some examples, computing device 200 may include additional engines.

Each engine of computing device 200 can include at least one machine-readable storage mediums (for example, more than one) and at least one processing resource (for example, more than one). For example, software that provides the functionality of engines on computing device 200 can be stored on a memory of a computer to be executed by a processing resource of the computer. In some examples, each engines of computing device 200 may include hardware in the form of a microprocessor on a single integrated circuit, related firmware, or other software for allowing microprocessor to operatively communicate with other hardware of computing device 200.

Query engine 201 is an engine of computing device 200 that includes a combination of hardware and software that allows computing device 200 to obtain a first completion time associated with an application request. In some examples, the application request may be received by a computing device that computing device 200 is communicatively coupled to through network 220, including second computing device 230A, or third computing device 230B. In some examples, communication network 220 may be a wireless network, a wired network, or a combination thereof. In some examples, network 220 may be an individual network or a collection of many such individual networks interconnected with each other and functioning as a single large network (e.g., the Internet or an intranet). In some examples, communication network 220 may be implemented as a local area network (LAN), wide area network (WAN), etc. In other examples, computing device 200 may be directly coupled to third computing device 230E and second computing device 230A.

Query engine 201 also allows computing device 200 to obtain a first response time associated with a first asynchronous operation triggered by the application request and a second response time associated with a second asynchronous operation triggered by the application request. In some examples, the first asynchronous operation and the second asynchronous operation involves the same two layers.

Correlation engine 202 is an engine of computing device 200 that includes a combination of hardware and software that allows computing device 200 to determine a first correlation score describing an effect of the first asynchronous operation on the application request. The first correlation score may be based, at least in part, on the first completion time and the first response time and may be determined as discussed above. The second correlation score may be based, at least in part, on the first completion time and the second response time. Additionally, correlation engine 202 may also allow computing device 200 to determine that the first asynchronous operation and the second asynchronous operation are dissimilar. In some examples, this may be done by clustering the URLs that represent the asynchronous operations. This determination allows correlation engine 202 to know to determine two correlation scores and not one correlation score.

Visualization engine 203 is an engine of computing device 200 that includes a combination of hardware and software that allows computing device 200 to generate visualization data representing the first correlation score and the second correlation score. In some examples, visualization engine 203 may allow computing device 200 to display the visualization data. In these examples, visualization engine 203 may include an output device as discussed above. In some examples, visualization engine 203 may allow another computing device communicatively coupled to visualization engine 203 to display the visualization data (e.g., second computing device 230A or third computing device 230B). In these examples, visualization engine may send the visualization data to second computing device or third computing device with instructions to display the data.

Computing device 200 of FIG. 2, which are described in terms of functional engines containing hardware and software, may include structural or functional aspects of computing device 100 of FIG. 1, which is described in terms of processors and machine-readable storage mediums. Additionally, computing device 200 may include structural or functional aspects of server 410 of FIG. 4

Figure 3:
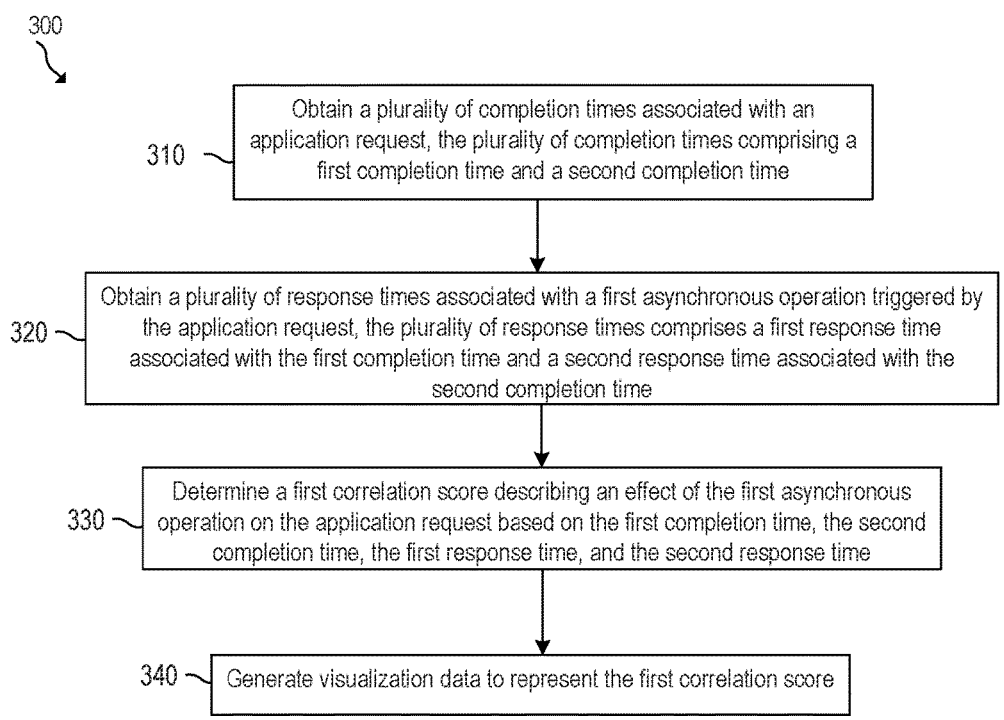
FIG. 3 is a flowchart of a method of determining a first correlation score, according to some examples.

FIG. 3 illustrates a flowchart for an example method 300 to determine a first correlation score. Although execution of method 300 is described below with reference to computing device 100 of FIG. 1, other suitable systems for execution of method 300 may be utilized (e.g., computing device 200 or system 400). Additionally, implementation of method 300 is not limited to such examples and method 300 may be used for any suitable device or system described herein or otherwise.

At 310 of method 300, processing resource 101 may execute instructions 111 to obtain a plurality of completion times associated with an application request. In some examples, the plurality of completion times obtained may comprise a first completion time and a second completion time. At 320 of method 300, processing resource 101 may execute instructions 112 to obtain a plurality of response times associated with a first asynchronous operation triggered by the application request. In some examples, the plurality of response time may include a first response time associated with the first completion time and a second response time associated with the second completion time.

At 330 of method 300, processing resource 101 may execute instructions 113 to determine a first correlation score describing an effect of the first asynchronous operation on the application request. In some examples, the first correlation score may be based on the first completion time, the second completion time, the first response time, and the second response time. At 340 of method 300, processing resource 101 may execute instructions 114 to generate visualization data to represent the first correlation score.

Although the flowchart of FIG. 3 shows a specific number of completion times and response times, method 300 is not limited the number shown. In some examples, functionalities described herein in relation to FIG. 3 may be provided in combination with functionalities described herein in relation to any of FIGS. 1-2, and 5-6. Although the flowchart of FIG. 3 shows certain functionalities as occurring in one step, the functionalities of one step may be completed in at least one step (e.g., in multiple steps). Additionally, although the flowchart of FIG. 3 shows a specific order of performance of certain functionalities, method 300 is not limited to that order. For example, some of the functionalities shown in succession in the flowchart may be performed in a different order, may be executed concurrently or with partial concurrence, or a combination thereof. For example, 310 and 320 may be performed concurrently.

FIG. 4 is a block diagram of a system 400 to determine a correlation score. System 400 includes server 410 that is communicatively coupled to at least one computing device (e.g., 430A, 430B) through communications network 420. Computing devices 430A and 430B may be desktop computers, servers, mobile devices, tablets, etc. Additionally, while two computing devices are shown, server 410 may be communicatively coupled to more or less computing devices.

Server 410 includes query engine 401, correlation engine 402, visualization engine 403, grouping engine 404, and memory 450. Each of these aspects of server 410 will be described below. Other engines may be added to server 410 for additional functionality. Engines 401, 402, 403, and 404 may interface with memory 450.

Each of engines 401, 402, 403, 404, and any other engines, may be any combination of hardware (e.g., a processor such as an integrated circuit or other circuitry) and software (e.g., machine or processor-executable instructions, commands, or code such as firmware, programming, or object code) to implement the functionalities of the respective engine. Such combinations of hardware and programming may be implemented in a number of different ways. A combination of hardware and software can include hardware (i.e., a hardware element with no software elements), software hosted at hardware (e.g., software that is stored at a memory and executed or interpreted at a processor), or at hardware and software hosted at hardware. Additionally, as used herein, the singular forms "a," "an," and "the" include plural referents unless the context clearly dictates otherwise. Thus, for example, the term "engine" is intended to mean at least one engine or a combination of engines. In some examples, server 410 may include additional engines.

Query engine 401 is an engine of server 410 that includes a combination of hardware and software that allows server 410 to obtain a first completion time associated with a first application request. In some examples, the first application request may be received by computing devices 430A and 430B from computing devices that 430A and 430B are communicatively coupled to (e.g., client devices). In some examples, the first application request may be made by users of computing devices 430A and 430B and received by computing devices 430A and 430B. Computing devices 430A and 430B may include engines including a combination of hardware and software that allows computing devices 430A and 430B to detect a completion of an application request. Query engine 401 may retrieve the information from computing devices 430A and 430B and store it in the completion and response times data 452 in memory 450. Memory 450 may be a machine-readable storage medium of server 400. While memory 450 is shown in FIG. 4 as being housed on server 400, memory 450 may be stored on a separate computing device as server 410 and accessible to engines of server 410.

Query engine 401 may also allow server 410 to obtain response times associated with a first operation triggered by the first application request. As discussed above, an application request triggers an application transaction, which may include at least one operation. Thus, in some examples, query engine 401 may allow server 410 to obtain any and/or all response times associated with any and/or all operations triggered by the first application request. In some examples, and as discussed above, the response times obtained are for operations that involve the same layers. In some examples, the operation is an asynchronous operation. Additionally, query engine 401 may allow server 401 to obtain any and/or all completion times associated with any and/or all application requests that are received/made by computing devices 430A and/or 430B.

Grouping engine 404 is an engine of server 410 that includes a combination of hardware and software that allows server 410 to group similar application requests together. The application requests may have different forms, even though they trigger similar application transactions. For example, a first application request with the URL http://myhost.com/apmappsServer/index.html-?TENANTID=980032860 has a different form that a second application request with the URL http://myhost.com/apmappsServer/index.html?TENANTID=980032864. However, these two application requests trigger similar (if not identical) application transactions. In other words, the first application request and the second application request may be represented by a single logical function, and thus may be grouped into the first application request group http://myhost.com/apmappsServer/index.html?TENANTID=*. In some examples, this grouping may be done through clustering of the application request. Grouping engine 404 may interface with completion and response times data 452 to retrieve the specific application requests and operations for grouping.

Grouping engine 404 also allows server 410 to group similar operations together. For example, in the example discussed above, if the first application request (URL http://myhost.com/apmappsServer/index.html?TENANTID=980032860) triggers a first operation and a second operation and the second application request (URL http://myhost.com/apmappsServer/index.html?TENANTID=980032864) triggers a third operation, the grouping of the first application request and the second application request (URL http://myhost.com/apmappsServer/index.html?TENANTID=*) may be determined as triggering the first, second, and third operation. Grouping engine 404 may allow server 410 to determine similar operations and group similar operations together. For example, grouping engine 404 may determine that the first operation is similar to the third operation and thus may group them together into one group. Grouping engine 404 may determine that the second operation is dissimilar to the third/first operations and place the second operation in a separate group.

In some examples, grouping engine 404 may determine that application requests are dissimilar. For example, query engine 401 may obtain a third completion time associated with a third application request and a fourth response time associated with an operation triggered by the third application request. Grouping engine 404 may determine that the third application request is dissimilar to the first/second application request and may place the third application request in a separate group. Grouping engine 404 then automatically determines that the fourth operation is dissimilar from any of the previous operations because the fourth asynchronous operation is triggered by an application request that is dissimilar to the application request that triggered the second asynchronous operation and the first asynchronous operation. Grouping engine 404 may store the grouping data in correlation data 451 of memory 450.

Correlation engine 402 is an engine of server 410 that includes a combination of hardware and software that allows server 410 to determine a first correlation score describing an effect of the first asynchronous operation on the first application request. The first correlation score may be based, at least in part, on the first completion time and the first response time and may be determined as discussed above in relation to instructions 113. Correlation engine 402 may also allow server 410 to determine correlation scores describing an effect of any and/or all asynchronous operations on any and/or all application requests for which query engine 401 obtains completion times and response times for.

Additionally, correlation engine 402 may determine correlation scores based on the groupings made by grouping engine 404. For example, in the example above with the first completion time (associated with the first application request), the second completion time (associated with the second application request), the third completion time (associated with the third application request), the first response time (associated with a first operation triggered by the first application request), the second response time (associated with a second operation triggered by the first application request), the third response time (associated with a third operation triggered by the second application request), the fourth response time (associated with a fourth operation triggered by the third application request), the grouping engine groups the first application request and the second application request together into a first group of application request and the third application request into its own group. Within the first group of application request, the grouping engine 402 groups the first operation with the third operation to one group of operation and the second operation into a separate group of operation. Thus, correlation engine 402 may determine three correlation scores, a first correlation score describing an effect of the first group of operation on the first group of application request, a second correlation score describing an effect of the second operation on the first group of application request, and a third correlation score describing an effect of the fourth operation on the third application request. The first correlation score may be based, at least in part, on the first completion time, the second completion time, the first response time, and the third response time. The second correlation score may be based, at least in part, on first completion time, and the second response time. The third correlation score may be based on the third completion time and the fourth response time.

Correlation engine 402 may also allow server 410 to update any previously determined correlation scores when a new response time and/or completion time is obtained by query engine 401, as discussed above in relation to computing device 100. In some examples, correlation engine 402 may determine a correlation score when at least one response time and at least one completion time is obtained by query engine 401. In some examples, correlation engine 402 may wait to determine a correlation score until at least thirty response times and thirty completion times (grouped into the one operation for one application request) is obtained. Correlation engine 402 may store data, such as sum accumulators used for the updating, as discussed above, in correlation data 451 in memory 450.

Visualization engine 403 is an engine of server 410 that allows server 403 to generate visualization data that represents a correlation score determined by correlation engine 402. Visualization engine 403 is similar to visualization engine 203.

Figure 5:
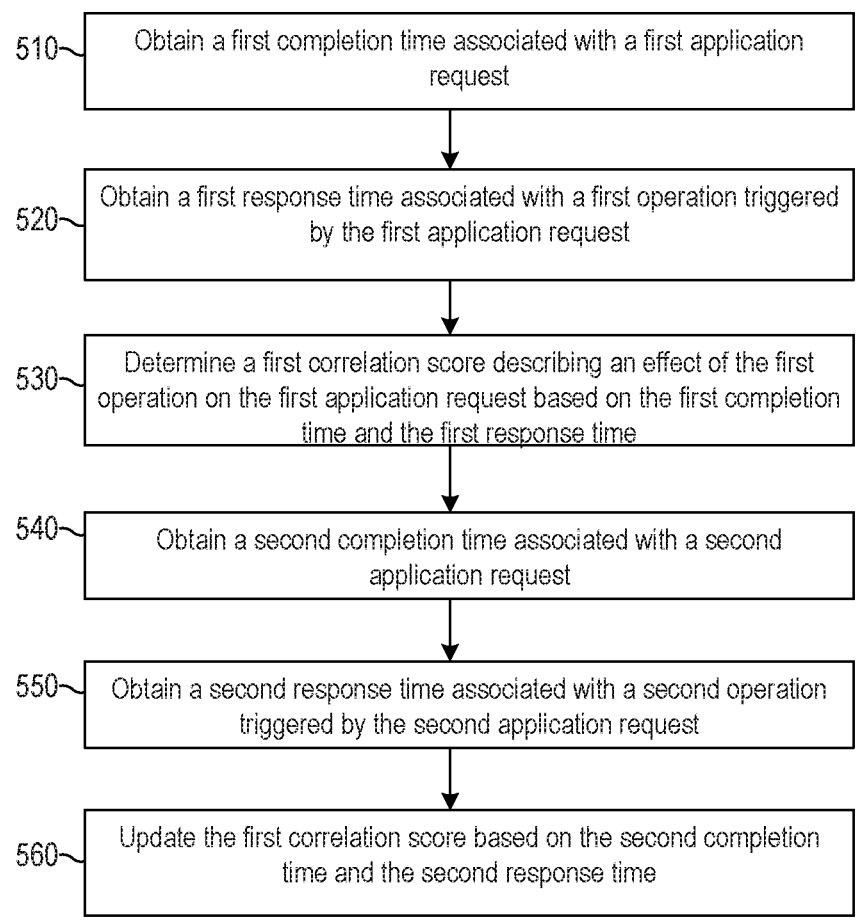
FIG. 5 is a flowchart of a method of updating a first correlation score, according to some examples.

FIG. 5 illustrates a flowchart for an example method 500 to determine a first correlation score and update a first correlation score. Although execution of method 500 is described below with reference to computing device 200 of FIG. 2, other suitable systems for execution of method 500 may be utilized (e.g., computing device 100 or system 400). Additionally, implementation of method 500 is not limited to such examples and method 500 may be used for any suitable device or system described herein or otherwise.

At 510 of method 500, query engine 201 of computing device 200 may obtain a first completion time associated with a first application request. As discussed above, in some examples, the first application request may be received at either second computing device 230A or third computing device 230B. In some examples, the first application request may be made at either second computing device 230A or third computing device 230B. At 520 of method 500, query engine 201 of computing device 200 may obtain a first response time associated with a first operation that is triggered by the first application request. In some examples, the first operation may be an asynchronous operation that is triggered by the first application request. In other examples, the first operation may be a synchronous operation. At 530 of method 500, correlation engine 202 of computing device 200 may determine a first correlation score describing an effect of the first operation on the first application request based, at least in part, on the first completion time and the first response time.

At 540 of method 500, query engine 202 of computing device 200 may obtain a second completion time associated with a second application request. In some examples, the second application request may be received at or requested by the same computing device 230A or 230B as the first application request. In other examples, the second application request may be received at or requested by a different computing as the first application request. At 550 of method 500, query engine 202 of computing device 200 may obtain a second response time associated with a second operation triggered by the second application request. In some examples, the second operation may be an asynchronous operation that is triggered by the second application request. In other examples, the second operation may be a synchronous operation.

At 560, correlation engine 202 of computing device 200 may update the first correlation score based on the second completion time and the second response time.

Although the flowchart of FIG. 5 shows a specific number of completion times and response times, method 500 is not limited the number shown. In some examples, functionalities described herein in relation to FIG. 5 may be provided in combination with functionalities described herein in relation to any of FIGS. 1-4, and 6. Although the flowchart of FIG. 5 shows certain functionalities as occurring in one step, the functionalities of one step may be completed in at least one step (e.g., in multiple steps). Additionally, although the flowchart of FIG. 5 shows a specific order of performance of certain functionalities, method 500 is not limited to that order. For example, some of the functionalities shown in succession in the flowchart may be performed in a different order, may be executed concurrently or with partial concurrence, or a combination thereof. For example, 510 and 520 may be performed concurrently.

Figure 6:
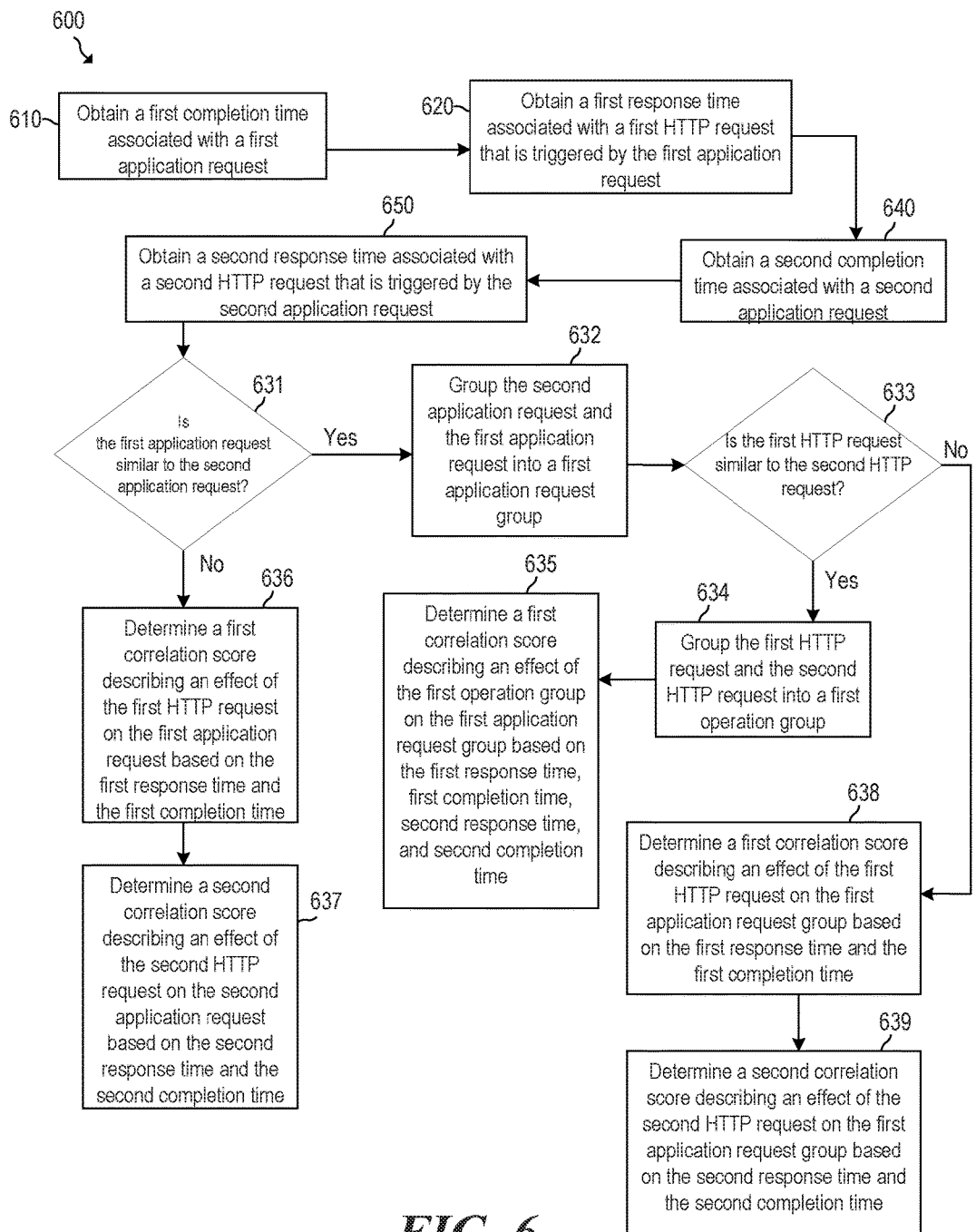
FIG. 6 is a flowchart of a method of determining a first correlation score, according to some examples.

FIG. 6 illustrates a flowchart for an example method 600 to determine correlation scores. Although execution of method 600 is described below with reference to computing device 400 of FIG. 4, other suitable systems for execution of method 600 may be utilized (e.g., computing device 100 or computing device 200). Additionally, implementation of method 500 is not limited to such examples and method 600 may be used for any suitable device or system described herein or otherwise.

At 610 of method 600, query engine 401 of server 400 may obtain a first completion time associated with a first application request. This may be obtained as described above in relation to 510 of method 500. At 620 of method 600, query engine 401 of server 400 may obtain a first response time associated with a first HTTP request triggered by the first application request. This may be obtained as described above in relation to 510 of method 500. At 640 of method 600, query engine 401 of server 400 may obtain a second completion time associated with a second application request. At 650 of method 600, query engine 401 of server 400 may obtain a second response time associated with a second HTTP request that is triggered by the second application request. 640 may be performed as described above in relation to 540 of method 500 and 650 may be performed as described above in relation to 550.

At 631, grouping engine 404 of server 400 may determine the similarity of the first application request to the second application request. This may be determined as discussed above. In some examples, this may be performed by clustering the application requests.

In response to a determination that the first application request is dissimilar to the second application request, method proceeds to 636 and 637. At 636, correlation engine 403 may determine a first correlation score describing an effect of the first HTTP request on the first application request based, at least in part, on the first response time and the first completion time. At 637, correlation engine 403 may determine a second correlation score describing an effect of the second HTTP request on the second application request based, at least in part, on the second response time and the second completion time.

In response to a determination that the first application request and the second application request are similar, method 600 proceeds to 632. At 632, grouping engine 404 groups the second application request and the first application request into a first application request group. At 633, grouping engine 404 determines if the first HTTP request is similar to the second HTTP request. In response to a determination that the first HTTP request is dissimilar to the second HTTP request group, method 600 proceeds to 638 and 639. At 638, correlation engine 402 determines a first correlation score describing an effect of the first HTTP request on the first application request group (which includes the first application request and the second application request) based, at least in part, on the first response time and the first completion time. At 639, correlation engine 402 determines a second correlation score describing an effect of the second HTTP request on the first application request group based on the second response time and the second completion time.

In response to a determination, at 633, the first HTTP request is similar to the second HTTP request, method 600 proceeds to 634. At 634, grouping engine 404 groups the first HTTP request and the second HTTP request into a first HTTP request group. At 635, correlation engine 402 determines a first correlation score describing an effect of the first HTTP request group (which includes the first HTTP request and the second HTTP request) on the first application request group (which includes the first application request and the second application request). The correlation score may be based, at least in part, on the first response time, the first completion time, the second response time, and the second completion time.

Although the flowchart of FIG. 6 shows a specific number of completion times and response times, method 600 is not limited the number shown. In some examples, functionalities described herein in relation to FIG. 6 may be provided in combination with functionalities described herein in relation to any of FIGS. 1-5. Although the flowchart of FIG. 6 shows certain functionalities as occurring in one step, the functionalities of one step may be completed in at least one step (e.g., in multiple steps). Additionally, although the flowchart of FIG. 6 shows a specific order of performance of certain functionalities, method 600 is not limited to that order. For example, some of the functionalities shown in succession in the flowchart may be performed in a different order, may be executed concurrently or with partial concurrence, or a combination thereof. For example, 610, 620, 640, and 650 may be performed concurrently.

Figure 7:
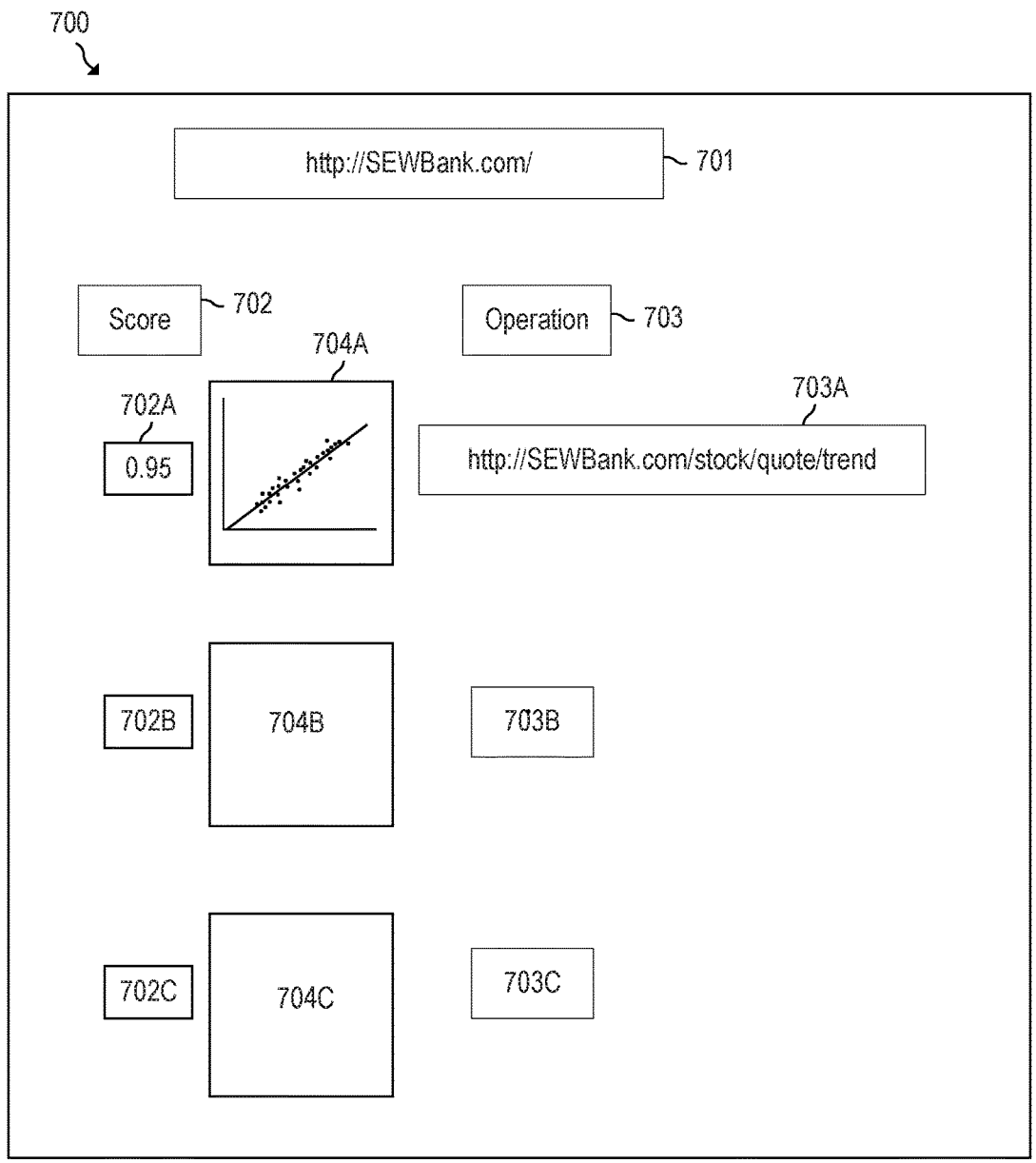
FIG. 7 is a diagram of a graphical user interface to display correlation scores, according to some examples.

FIG. 7 shows an example of some elements of a user interface that represent correlation scores. This user interface may be generated by visualization data generated by the computing devices and systems disclosed herein. 701 represents the application request (e.g., the first application request, the second application request, etc.). 702 represents a heading to indicate that the information below the 702 heading relate to correlation scores. Areas 702A-702C and 704A-704C may be representations of correlation scores. For example areas 702A-702C may be the correlation scores. 704A-704C may be other representations of the correlation score, such as a graph of the different X, Y values used in calculating the correlation score. 703 represents a heading to indicate that the information below the 703 heading relate to the operations associated to the correlation scores. 703A-703C may list the specific operation associated to a specific correlation score. For example, the application request http://SEWBank.com/ triggered operations 703A, 703B, and 703C. Correlation score 702A describes an effect of operation 703A on application request 701. 704A is a representation of the correlation score 702A.

All of the features disclosed in this specification (including any accompanying claims, abstract and drawings), and/or all of the elements of any method or process so disclosed, may be combined in any combination, except combinations where at least some of such features and/or elements are mutually exclusive. In the foregoing description, numerous details are set forth to provide an understanding of the subject matter disclosed herein. However, examples may be practiced without some or all of these details. Other examples may include modifications and variations from the details discussed above. It is intended that the appended claims cover such modifications and variations.

What is claimed is:

1. A non-transitory machine-readable storage medium comprising instructions executable by a processing resource to: in response to an application request accessing a webpage, perform a sequence of operations including a first asynchronous operation, wherein the first asynchronous operation is an operation that is triggered by the application request and is independent of other operations in the sequence; obtain a plurality of completion times for a completion of the application request, wherein the plurality of completion times comprises a first completion time for completing a first instance of the application request and a second completion time for completing a second instance of the application request; obtain a first response time which is a length of time to complete the first asynchronous operation in the first instance of the application request and a second response time which is a length of time to complete the first asynchronous operation in the second instance of the application request; determine a first correlation score describing an effect of the first asynchronous operation on the application request based on the first completion time, the second completion time, the first response time, and the second response time, wherein to determine the first correlation score, the processing resource is to: determine a first average of the first and second response times, determine a second average of the first and second completion times, and determine a ratio of the first average over the second average as the first correlation score, wherein a value of the ratio indicates a level of effect the first asynchronous operation has on the application request; and generate visualization data representing the determined first correlation score indicating how much the first asynchronous operation affects the completion of the application request.

2. The non-transitory machine-readable storage medium of claim 1, wherein the instructions are executable to cause the processing resource to:
obtain a third completion time which is a length of time to complete a third instance of the application request;
obtain a third response time which is a length of time to complete the first asynchronous operation in the third instance of the application request;
update the first correlation score with the third completion time and the third completion response time; and
update the visualization data to represent the updated first correlation score.

3. The non-transitory machine-readable medium of claim 1, wherein the application request is a web page request, and wherein the first and second completion times associated with the application request each describe a load time of the web page.

4. The non-transitory machine-readable medium of claim 1, wherein the application request is a user input, and wherein the first and second completion times associated with the application request each describe a wait time after the user input.

5. The non-transitory machine-readable medium of claim 2, wherein the instructions are executable to cause the processing resource to:
obtain a plurality of response times associated with a second asynchronous operation triggered by the application request, wherein the plurality of response times associated with the second asynchronous operation comprises a fourth response time which is a length of time to complete the second asynchronous operation in the first instance of the application request associated with the first completion time and a fifth response time which is a length of time to complete the second asynchronous operation in the second instance of the application request;
determine a second correlation score describing an effect of the second asynchronous operation on a completion of the application request based on the fourth response time, the fifth response time, the first completion time, and the second completion time; and
generate visualization data representing the second correlation score.

6. The non-transitory machine-readable medium of claim 1, wherein the first correlation score is based on a Pearson correlation.

7. The non-transitory machine-readable medium of claim 1, wherein the instructions are executable to cause the processing resource to:
obtain a third completion time which is a length of time to complete a second application request; and group the application request with the second application request.

8. A computing device comprising: a processor; and a memory storing instructions that when executed cause the processor to: in response to an execution of a first instance of a first application request accessing a webpage, perform a sequence of operations including a first asynchronous operation and a second asynchronous operation, wherein asynchronous operations are operations that are triggered by the first application request and independent of other operations in the sequence; obtain a first completion time which is a length of time to complete the first instance of the first application request; obtain a first response time which is a length of time to complete the first asynchronous operation in the first instance of the first application request; obtain a second response time which is a length of time to complete the second asynchronous operation in the first instance of the first application request; determine a first correlation score describing an effect of the first asynchronous operation on the first application request based on the first completion time and the first response time, by determining a first ratio of the first response time over the first completion time, wherein a value of the first ratio is the first correlation score that indicates a level of effect the first asynchronous operation has on the first application request; determine a second correlation score describing an effect of the second asynchronous operation on the first application request based on the first completion time and the second response time, by determining a second ratio of the second response time over the first completion time, wherein a value of the second ratio is the second correlation score that indicates a level of effect the second asynchronous operation has on the first application request; and display visualization data representing the determined first correlation score and the determined second correlation score indicating how much the first and second asynchronous operations affect the completion of the first application request.

9. The computing device of claim 8, wherein the instructions are executable to cause the processor to obtain a third response time which is a length of time to complete the first asynchronous operation in a second instance of the first application request, and update the first correlation score based on the third response time.

10. The computing device of claim 8, wherein the instructions are executable to cause the processor to obtain a second completion time which is a length of time to complete a second instance of the first application request, and update the first correlation score based on the second completion time.

11. The computing device of claim 8, wherein the first application request is a web page request, and wherein the first completion time describes a load time of the web page.

12. The computing device of claim 8, wherein the first application request is a user input in a mobile application, and wherein the first completion time describes a wait time between the user input and the response of the mobile application.

13. The computing device of claim 8, wherein the first and the second correlation scores are determined using a modified Pearson process.

14. The computing device of claim 8, wherein the instructions are executable to cause the processor to obtain a second completion time for completing a second application request, and group the second application request with the first application request.

15. A method comprising: in response to a first application request accessing a webpage, performing, by a processing resource, a first sequence of operations that includes a first operation; obtaining, by the processing resource, a first completion time which is a length of time to complete the first application request; obtaining, by the processing resource, a first response time which is a length of time to complete the first operation triggered by the first application request; determining, by the processing resource, a first correlation score describing an effect of the first operation on the first application request, by determining a first ratio of the first response time over the first completion time, wherein a value of the first ratio is the first correlation score that indicates a level of effect the first operation has on the first application request; in response to a second application request accessing the webpage, performing, by the processing resource, a second sequence of operations that includes a second operation; obtaining, by the processing resource, a second completion time which is a length of time to complete the second application request; obtaining, by the processing resource, a second response time which is a length of time to complete the second operation triggered by the second application request; updating, by the processing resource, the determined first correlation score based on the second response time and the second completion time, by determining a first average of the first and second response times, determining a second average of the first and second completion times, and determining a second ratio of the first average over the second average, wherein the second ratio is the updated first correlation score that indicates a level of effect the second operation has on the second application request; and displaying, by the processing resource, the determined first correlation score and the updated first correlation score on an output device indicating how much the first and second operations affect the completion of the first and second application requests.

16. The method of claim 15, wherein the first application request is a web page request and the first operation is an XML HTTP request.

17. The method of claim 15, wherein the first application request is a user input in a mobile application, and wherein the first response time describes a lag time between the user input and a visible response of the mobile application to the user input.

18. The method of claim 15, comprising:
determining, by the processing resource, that the first application request and the second application request are similar; and
determining, by the processing resource, that the first operation and the second operation are similar.

19. The method of claim 18, comprising:
obtaining, by the processing resource, a third completion time associated with a third application request;
obtaining, by the processing resource, a third response time associated with a third operation triggered by the third application request;
determining, by the processing resource, that the third application request and the first application request are dissimilar;
determining, by the processing resource, a second correlation score describing an effect of the third operation on the third application request by determining a ratio of the third response time over the third completion time.

20. The method of claim 19, comprising displaying the second correlation score on the output device.

* * * * *